United States Patent
Muller et al.

(10) Patent No.: US 10,168,875 B2
(45) Date of Patent: Jan. 1, 2019

(54) DISPLAYING DYNAMIC GRAPHICAL CONTENT IN GRAPHICAL USER INTERFACE (GUI) CONTROLS

(71) Applicant: International Business Machines Corporation, Armonk, NY (US)

(72) Inventors: Michael Muller, Medford, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 14/561,216

(22) Filed: Dec. 5, 2014

(65) Prior Publication Data
US 2015/0153938 A1 Jun. 4, 2015

Related U.S. Application Data

(63) Continuation of application No. 11/314,983, filed on Dec. 21, 2005, now Pat. No. 8,935,634.

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0481* (2013.01); *G06F 9/451* (2018.02); *G06F 3/04847* (2013.01)

(58) Field of Classification Search
CPC .. G06F 3/04842; G06F 3/0481; G06F 9/4443; G06F 3/04847
See application file for complete search history.

(56) References Cited

U.S. PATENT DOCUMENTS 5,619,631 A  4/1997 Schott
5,761,380 A  6/1998 Lewis et al.
(Continued)

FOREIGN PATENT DOCUMENTS

CN  1432912  7/2003

OTHER PUBLICATIONS

Nielson, Jakob, "Checkboxes vs. Radio Buttons", https://www.nngroup.com/articles/checkboxes-vs-radio-buttons/, Sep. 27, 2004 (Year: 2004).*

(Continued)

*Primary Examiner* — Patrick F Riegler
(74) *Attorney, Agent, or Firm* — Steven M. Greenberg, Esq.; Shutts & Bowen LLP

(57) ABSTRACT

Embodiments of the invention address deficiencies of the art in respect to user interface control groups and provide a method, system and computer program product for rendering a set of user interface controls with dynamic content in a GUI. In one embodiment, the invention can include a data processing system including a set of user interface controls and control data including a set of cumulative selection metrics for each user interface control in the set. Each user interface control in the set, in turn, can include a label and an indicator of cumulative metrics for the user interface control. For instance, the set of user interface controls can include a set of radio buttons in a radio button control group. As another example, the set of user interface controls can include a set of check boxes in a check box control group.

12 Claims, 2 Drawing Sheets

(51) Int. Cl.
*G06F 3/0481* (2013.01)
*G06F 9/451* (2018.01)

(56) References Cited

U.S. PATENT DOCUMENTS

| | | | |
|---|---|---|---|
| 5,844,572 A | 12/1998 | Schott | |
| 6,417,855 B1 | 7/2002 | Yonts | |
| 6,590,577 B1 | 7/2003 | Yonts | |
| 6,848,075 B1* | 1/2005 | Becker | G06F 17/30876 707/E17.112 |
| 2002/0075302 A1* | 6/2002 | Simchik | G06F 17/30905 715/745 |
| 2002/0129052 A1* | 9/2002 | Glazer | G06F 17/30038 715/202 |
| 2002/0171677 A1* | 11/2002 | Stanford-Clark | G06F 9/4443 715/733 |
| 2004/0024724 A1* | 2/2004 | Rubin | G06N 5/025 706/55 |
| 2004/0125150 A1* | 7/2004 | Adcock | G06F 17/30274 715/810 |
| 2004/0207662 A1* | 10/2004 | Anderson | G06T 17/20 715/772 |
| 2005/0044508 A1 | 2/2005 | Stockton | |
| 2005/0086634 A1* | 4/2005 | Bates | G06F 11/328 717/101 |
| 2005/0114510 A1* | 5/2005 | Error | G06Q 30/02 709/225 |
| 2006/0048074 A1* | 3/2006 | Klein | G06F 17/30398 715/811 |
| 2006/0123340 A1* | 6/2006 | Bailey | G06F 9/44526 715/700 |
| 2007/0124676 A1* | 5/2007 | Amundsen | G06F 17/30587 715/704 |

OTHER PUBLICATIONS

*Dynamic Management of Resources for Different National Languages*; IBM Technical Disclosure Bulletin, vol. 40, No. 09, Sep. 1997, pp. 171-173.

*Smart Application Selection Assistant*; IBM Technical Bulletin, vol. 38, No. 02, Feb. 1995, pp. 353-355.

* cited by examiner

DISPLAYING DYNAMIC GRAPHICAL CONTENT IN GRAPHICAL USER INTERFACE (GUI) CONTROLS

CROSS-REFERENCE TO RELATED APPLICATIONS

This application is a Continuation of U.S. application Ser. No. 11/314,983, filed Dec. 21, 2005, now U.S. Pat. No. 8,935,634, which is incorporated herein by reference in their entirety.

BACKGROUND OF THE INVENTION

Field of the Invention

The present invention relates to the field of graphical user interface (GUI) controls and more particularly to displaying dynamic content in a GUI control.

Description of the Related Art

The conventional graphical user interface (GUI) has been widely used for many years. The primary function of the GUI includes providing visual controls with which the end-user can interact with an underlying application. Though the common GUI includes many stock visual controls, a select few visual controls can be combined to accommodate most computer-human interactions required by an application. For example, the static text box control can be used to present text to the end-user while an edit box can permit the user to provide textual input to the application. A radio button control can provide for the exclusive selection of an element from among a field of elements, while a checklist box control can provide for the non-exclusive selection of elements from among a field of elements.

User interface controls ordinarily provide a visual interface which permits some sort of user interactivity, such as a mouse click for a button or check box, and an insert caret for a text field. While a textual label ordinarily is associated with the control as a separate component, the textual label for the control and the control itself often are viewed as a singular entity. As such, the combination of the textual label and the control provide two basic informational components: the identity of the control and the immediate state of the control, e.g. selected, input provided, etc. Notably, over the years, the basic idea of the user interface control has not changed, despite increases in the expressive power of other aspects of the GUI.

Certain types of a GUI controls can produce clutter in a view due to the separate nature of the label and control. In particular, where the label for the control exceeds the width of the control itself, a limited number of controls can be placed adjacent to one another in a view while maintaining an orderly appearance. Also, the distance between each control can increase as the width of the label far exceeds that of the control. In many cases, groups of controls are arranged together such as an arrangement of radio buttons grouped together to provide a singular choice among the choices corresponding to the radio buttons. In this case, it can be important to arrange the controls close enough together to indicate that a user is to choose one radio button from amongst the arrangement of radio buttons.

Oftentimes, controls are used repetitively in sequence in a form such as a survey, or in a multiple choice examination. Other times, a single form can be used repeatedly for different circumstances, such as the repeated application of a selection of criteria to a unique data instance. In the latter circumstance, the form can be used repeatedly to process different records in a data set. Conventionally, the user interface controls in a form of this type provide only a static view of the current record or selection. The static view only indicates the current state of the control—in the case of a radio button group, the selected radio button. User interface controls in a form of this type, however, cannot provide a dynamic, cumulative view of the past use of the user interface control so as to guide the user in making a contemporary selection in the control.

BRIEF SUMMARY OF THE INVENTION

Embodiments of the present invention address deficiencies of the art in respect to user interface control groups and provide a novel and non-obvious method, system and computer program product for rendering a set of user interface controls with dynamic content in a GUI. In one embodiment, the invention can include a data processing system including a set of user interface controls and control data including a set of cumulative selection metrics for each user interface control in the set. Each user interface control in the set, in turn, can include a label and an indicator of cumulative metrics for the user interface control. For instance, the set of user interface controls can include a set of radio buttons in a radio button control group. As another example, the set of user interface controls can include a set of check boxes in a check box control group.

In one aspect of the invention, the cumulative selection metrics for each user interface control can include a numerical indicator of a number of times the user interface control had been selected in the GUI. In another aspect of the invention, the label can include a textual label. Alternatively, the label can include a color. In either case, the indicator of cumulative metrics for the user interface control can include a color filled portion of the user interface control proportional to the cumulative metrics for the user interface control. For example, the color filled portion can be pie shaped.

Alternatively, the indicator of cumulative metrics for the user interface control can include an arrangement of selection icons filling a portion of the user interface control. For example, the selection icons can include different types of selection icons representative additional dimensions of the cumulative selection metric for the user interface control. Finally, a target indicator can be disposed in the user interface control indicating a preferred cumulative selection metric for the user interface control. As such, an arrow can indicate whether the cumulative selection metric for the user interface control exceeds or falls short of the target indicator.

In another embodiment of the invention, a method for rendering a set of user interface controls with dynamic content in a GUI can include determining a cumulative selection metric for a user interface control in the set of user interface controls, and rendering the cumulative selection metric for a user interface control within the user interface control in the set. The method further can include color filling a portion of the user interface control proportional to the cumulative selection metric for the user interface control. The method yet further can include rendering a target indicator in the user interface control representative of a preferred cumulative selection metric for the user interface control. Finally, the method can include rendering an arrow in the user interface control indicating whether the cumulative selection metric for the user interface control exceeds or falls short of the target indicator.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamically displaying graphical content in a user interface control group. In accordance with an embodiment of the present invention, a user interface control group can provide a set of selectable user interface controls. Each of the selectable user interface controls can provide both a label and a dynamic indicator of cumulative selection metrics for the user interface control. Optionally, a graphical indication of a target metric for each selectable user interface control can be included in the user interface control as can a graphical indication of the cumulative selection metrics for comparison to the target metric. In this way, dynamic information regarding the selection of a user interface control can be provided to an end user so as to guide the selection of a user interface control in the control group.

Figure 1:
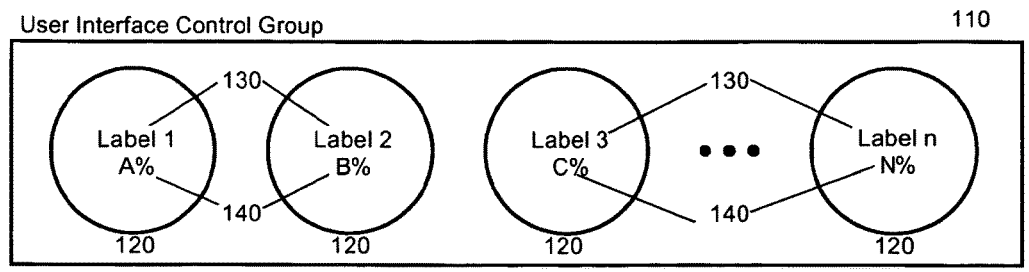
FIG. 1 is a pictorial illustration of a user interface control group configured to display dynamic graphical content.

In illustration, FIG. 1 is a pictorial illustration of a user interface control group configured to display dynamic graphical content within a GUI. The user interface control group 110 can include a set of selectable user interface controls 120. The set of selectable user interface controls 120 can support a mutually exclusive selection meaning that only one of the user interface controls 120 can be selected in the control group 110. Each of the user interface controls 120 can incorporate a static label 130. Furthermore, each of the user interface controls 120 can include an indicator of cumulative selection metrics 140. In this regard, the indicator of cumulative selection metrics 140 can indicate how often each particular one of the user interface controls 120 has been selected within the GUI.

Figure 2:
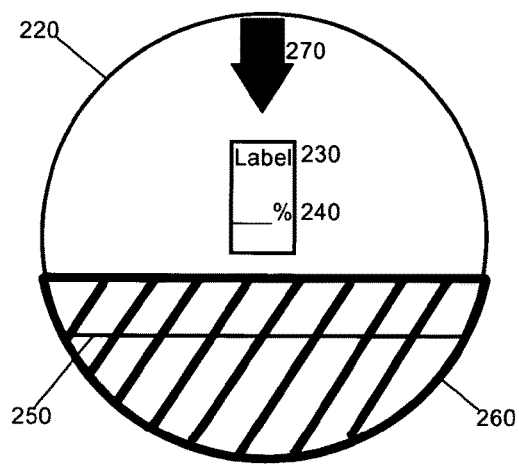
FIG. 2 is a schematic illustration of a user interface control for use in the user interface control group of FIG. 1.

Each user interface control 120 can vary from a simplistic combination of a textual form of the label 130 and textual form of the indicator of cumulative selection metrics 140, to a complex graphical presentation of the label 130 and indicator of cumulative selection metrics 140. For example, FIG. 2 is a schematic illustration of a user interface control for use in the user interface control group of FIG. 1. As shown in FIG. 2, a user interface control 220 can have both a textual label 230 and a textual indicator of cumulative selection metrics 240.

Additionally, the user interface control 220 can include a graphical indicator of the cumulative selection metrics 260. The graphical indicator of cumulative selection metrics 260 can include a colored fill of the user interface control 220 which consumes a portion of the user interface control proportional to the cumulative selection metrics shown for the textual indicator of cumulative selection metrics 240. Optionally, a target indicator 250 can be provided which indicates a target selection metric for the user interface control 220. In this way, when superimposed over the graphical indicator of cumulative selection metrics 260, it will be apparent visually whether the choice represented by the user interface control 220 has been selected a preferred number of times. Optionally, an arrow indicator 270 can be provided which can indicate whether the cumulative selection metrics for the user interface control 220 exceed or fall short of the target indicator 250.

Figure 3:
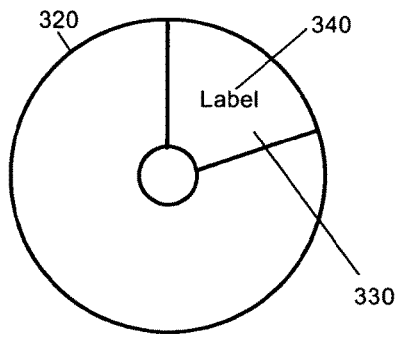
FIG. 3 is a schematic illustration of an alternative user interface control for use in the user interface control group of FIG. 1.

FIG. 3 is a schematic illustration of an alternative user interface control for use in the user interface control group of FIG. 1. As shown in FIG. 3, the user interface control 320 can include a label 340 which includes a textual label, or a graphical representation of the label, such as a specific color. A portion 330 of the user interface control 320 can be filled with the color for the label 340 in a pie-chart form so as to consume a portion 330 of the user interface control 320 proportional to the selection metrics for the user interface control 320. In this way, the user interface control 320 of FIG. 3 can indicate visually the selection metrics for the user interface control 320.

Figure 4:
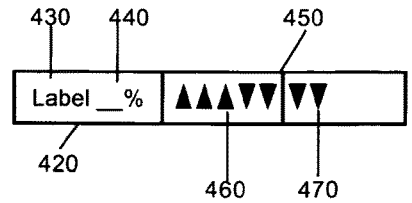
FIG. 4 is a schematic illustration of another alternative user interface control for use in the user interface control group of FIG. 1.

FIG. 4 is a schematic illustration of another alternative user interface control for use in the user interface control group of FIG. 1. As shown in FIG. 4, a user interface control 420 can include a label 430 and an indicator of cumulative selection metrics 440 for the user interface control 420. Additionally, a target indicator 450 can be provided to graphically indicate a target selection metric for the user interface control 420. A set of selection icons 460, 470 can fill a portion of user interface control 420 to graphically indicate proportionally the selection metric for the user interface control 420. Notably, the selection icons 460, 470 can vary to provide an additional layer of information regarding the selection metrics. Specifically, the selection icons 460, 470 can indicate a second dimension of cumulative data for the user interface control 420.

Optionally, the user interface control 420 can be a checkbox whose value (checked or unchecked) can remain independent of other checkboxes in a user interface. In this optional circumstance, the selection metric for the checkbox can be based upon the selection of one or more companion checkboxes in other user interfaces. For instance, the selection metric can represent a percentage of end users who have applied a checked value to a companion checkbox in a user interface. Consequently, the selection metric can reflect the value applied to the checkbox by multiple, different end users through different user interfaces.

Figure 5:
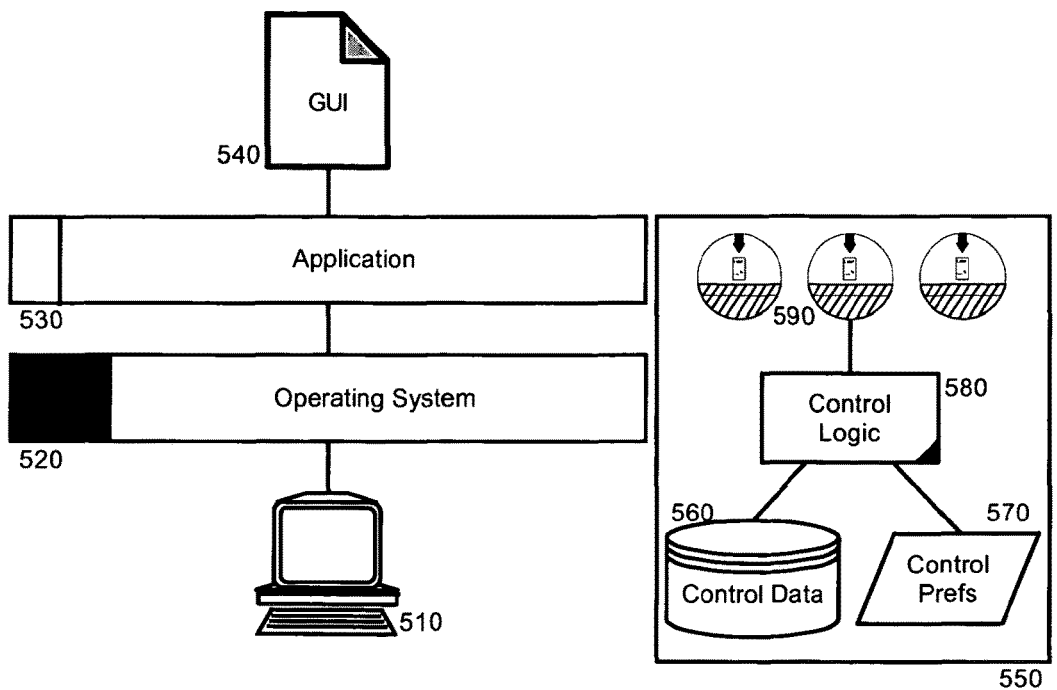
FIG. 5 is a block diagram illustrating a data processing system configured to dynamically display graphical content in a user interface control group; and, FIG. 6 is a flow chart illustrating a process for dynamically displaying graphical content in a user interface control group.

The different user interface controls shown in FIGS. 2 through 4 can be disposed within a GUI in a data processing system. In further illustration, FIG. 5 is a block diagram illustrating a data processing system configured to dynamically display graphical content in a user interface control group. As shown in FIG. 5, the data processing system can include a host computing platform 510 including an operating system 520. The operating system 520 can host an application 530 providing a GUI 540. Notably, the operating system 520 can be coupled to a resource defining a user interface control group 550. Implementations of the user interface control group 550 can be rendered within the GUI 540 for the application 530.

The user interface control group 550 can include a set of user interface controls 590 managed by control logic 580. The control logic 580 can be coupled to both control data 560 and control preferences 570. The control data 560 can include a one or more dimensions of cumulative metrics for the selection of each individual user interface control in the set of user interface controls 590. The control preferences 570, in turn, can include user specified settings for each of the user interface controls in the set of user interface controls 590. Examples include target metrics for the set of user interface controls 590 and a preferred appearance for each user interface control in the set of user interface controls 590.

Figure 6:
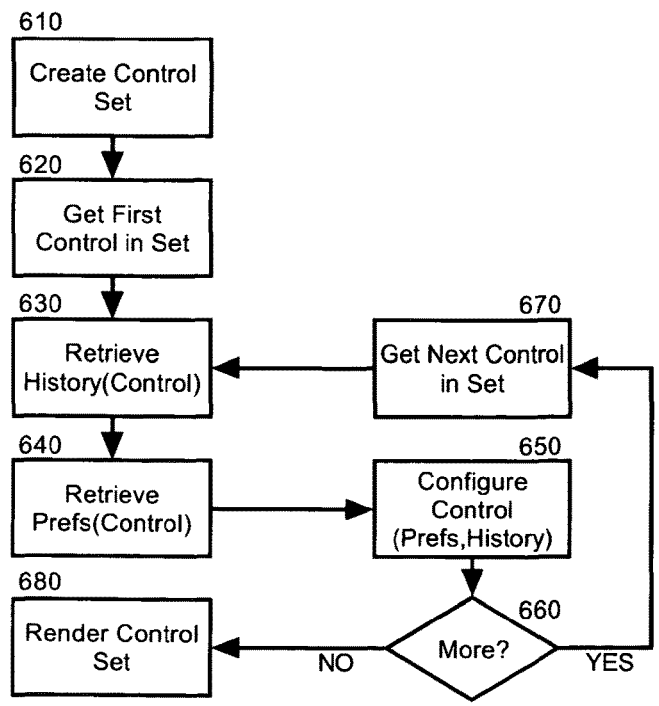

In operation, the control logic 580 can accumulate selection metrics for each user interface control in the set of user interface controls 590 and can dynamically adjust the appearance of each user interface control in the set of user interface controls 590. In more particular illustration, FIG. 6 is a flow chart illustrating a process for dynamically displaying graphical content in a user interface control group. Beginning in block 610, a set of user interface controls can be created for a GUI. In block 620, a first user interface control in the set can be selected for processing and, in block 630, the cumulative metrics for the selected user interface control can be retrieved. Likewise, in block 640, control preferences for the selected user interface control can be retrieved.

In block 650, the selected control can be configured according to the retrieved cumulative metrics and control preferences. Subsequently, in decision block 660, if further user interface controls in the set remain to be configured, the process can continue in block 670 where a next user interface control in the set of user interface controls can be selected for processing. The newly selected user interface control can be processed in blocks 630 through 650. When no further user interface controls remain to be processed in decision block 660, in block 680, the set of user interface controls can be rendered in the GUI.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for rendering a set of user interface controls with dynamic content in a graphical user interface (GUI), the method comprising:

grouping different user interface controls into the set of user interface controls in a GUI, a selection of one of the set of user interface controls being mutually exclusive so that only one of the different user interface controls of the set of user interface controls is selectable at a given moment in time;

determining a cumulative selection metric for each of the user interface controls in the set of user interface controls based upon a selection of each corresponding one of the user interface controls by multiple different end users; and, rendering an indicator within each of the user interface controls of a corresponding cumulative selection metric along with an associated static text label indicating the corresponding cumulative selection metric, the indicator comprising a colored fill of a corresponding one of the user interface controls which consumes a portion of the corresponding one of the user interface controls proportional to the corresponding cumulative selection metrics indicated by the static text label.

2. The method of claim 1, wherein the static text label is a numerical value specifying a percentage of how often the user interface control in the set of user interface controls has been selected.

3. The method of claim 1, wherein determining the cumulative selection metric for the user interface control in the set of user interface controls based upon the selection of the user interface control by multiple different end users, comprises retrieving cumulative metrics for the user interface control in the set of user interface controls.

4. The method of claim 1, wherein rendering the indicator of the cumulative selection metric for the user interface control within the user interface control and also the static text label for the user interface control within the user interface control in the set of user interface controls, comprises:

retrieving control preferences for the user interface control in the set of user interface controls, the control preferences specifying a preferred appearance of the user interface control; and, rendering the indicator of the cumulative selection metric for the user interface control within the user interface control and also the static text label for the user interface control within the user interface control in the set of user interface controls according to the retrieved control preferences.

5. A data processing system configured to render a set of user interface controls with dynamic content in a graphical user interface (GUI), the data processing system comprising:

a computer comprising at least one processor and a memory;

a computing application executing in the memory of the computer comprising program code enabled to render a graphical user interface (GUI) on the computer; and, control logic executing in the memory of the computer, the control logic comprising program code enabled to group different user interface controls into the set of user interface controls in the GUI, a selection of one of the set of user interface controls being mutually exclusive so that only one of the different user interface controls of the set of user interface controls is selectable at a given moment in time, to determine a cumulative selection metric for each of the user interface controls in the set of user interface controls based upon a selection of each corresponding one of the user interface controls by multiple different end users, and to render an indicator within each of the user interface controls of a corresponding cumulative selection metric along with an associated static text label indicating the corresponding cumulative selection metric, the indicator comprising a colored fill of a corresponding one of the user interface controls which consumes a portion of the corresponding one of the user interface controls proportional to the corresponding cumulative selection metrics indicated by the static text label.

6. The data processing system of claim 5, wherein the static text label is a numerical value specifying a percentage of how often the user interface control in the set of user interface controls has been selected.

7. The data processing system of claim 5, wherein the control logic comprising program code enabled to determine the cumulative selection metric for the user interface control in the set of user interface controls based upon the selection of the user interface control by multiple different end users, comprises retrieving cumulative metrics from a database for the user interface control in the set of user interface controls.

8. The data processing system of claim 5, wherein the control logic comprising program code enabled to render the indicator of the cumulative selection metric for the user interface control within the user interface control and also the static text label for the user interface control within the user interface control in the set of user interface controls comprises program code enabled to retrieve control preferences for the user interface control in the set of user interface controls, the control preferences specifying a preferred appearance of the user interface control and to render the indicator of the cumulative selection metric for the user interface control within the user interface control and also the static text label for the user interface control within the user interface control in the set of user interface controls according to the retrieved control preferences.

9. A computer program product comprising a non-transitory computer usable storage medium having computer usable program code stored thereon for rendering a set of user interface controls with dynamic content in a graphical user interface (GUI), said computer program product including:

computer usable program code for grouping different user interface controls into the set of user interface controls in a GUI, a selection of one of the set of user interface controls being mutually exclusive so that only one of the different user interface controls of the set of user interface controls is selectable at a given moment in time;

computer usable program code for determining a cumulative selection metric for each of the user interface controls in the set of user interface controls based upon a selection of each corresponding one of the user interface controls by multiple different end users; and, computer usable program code for rendering an indicator within each of the user interface controls of a corresponding cumulative selection metric along with an associated static text label indicating the corresponding cumulative selection metric, the indicator comprising a colored fill of a corresponding one of the user interface controls which consumes a portion of the corresponding one of the user interface controls proportional to the corresponding cumulative selection metrics indicated by the static text label.

10. The computer program product of claim 9, wherein the static text label is a numerical value specifying a percentage of how often the user interface control in the set of user interface controls has been selected.

11. The computer program product of claim 9, wherein the computer usable program code for determining the cumulative selection metric for the user interface control in the set of user interface controls based upon the selection of the user interface control by multiple different end users, comprises computer usable program code for retrieving cumulative metrics for the user interface control in the set of user interface controls.

12. The computer program product of claim 9, wherein the computer usable program code for rendering the indicator of the cumulative selection metric for the user interface control within the user interface control and also the static text label for the user interface control within the user interface control in the set of user interface controls, comprises:

computer usable program code for retrieving control preferences for the user interface control in the set of user interface controls, the control preferences specifying a preferred appearance of the user interface control; and, computer usable program code for rendering the indicator of the cumulative selection metric for the user interface control within the user interface control and also the static text label for the user interface control within the user interface control in the set of user interface controls according to the retrieved control preferences.

* * * * *